United States Patent [19]

Claussen et al.

[11] Patent Number: 4,908,171

[45] Date of Patent: Mar. 13, 1990

[54] METHOD OF SINTERING ARTICLES OF SILICON NITRIDE

[75] Inventors: Nils Claussen, Leonberg; Jürgen Jahn, Stetten; Günter Petzow, Leinfelden-Echterdingen, all of Fed. Rep. of Germany

[73] Assignee: Max-Planck-Gesellschaft zur Foedering der Wissenschaften e.V., Goettingen, Fed. Rep. of Germany

[21] Appl. No.: 150,007

[22] Filed: Jan. 27, 1988

Related U.S. Application Data

[63] Continuation of Ser. No. 857,521, Apr. 23, 1986, abandoned, which is a continuation of Ser. No. 710,941, Mar. 13, 1985, abandoned, which is a continuation of Ser. No. 452,279, Dec. 22, 1982, abandoned, which is a continuation of Ser. No. 200,845, Oct. 27, 1980, abandoned, which is a continuation of Ser. No. 613, Jan. 2, 1979, abandoned.

[30] Foreign Application Priority Data

Jan. 3, 1978 [DE] Fed. Rep. of Germany ....... 2800174

[51] Int. Cl.$^4$ ............................................. C04B 35/58
[52] U.S. Cl. ........................................ 264/56; 264/67; 501/97; 501/98
[58] Field of Search ..................... 264/67, 56; 501/97, 501/98

[56] References Cited

U.S. PATENT DOCUMENTS

| | | | |
|---|---|---|---|
| 3,992,497 | 11/1976 | Terwilliger et al. | 501/97 |
| 4,073,845 | 2/1978 | Buljan et al. | 501/97 |
| 4,087,500 | 5/1978 | Fisher et al. | 264/65 |
| 4,143,107 | 3/1979 | Ishii et al. | 264/65 |
| 4,225,356 | 9/1980 | Prochazka et al. | 501/97 |

FOREIGN PATENT DOCUMENTS 54-107913  8/1979  Japan ................................... 501/97

OTHER PUBLICATIONS

Stanley, "Attrition Milling of Ceramic Oxides," *Ceramic Bulletin*, vol. 53, No. 11 (1974), pp. 813–815.
Herbell, "Effect of Dry Attrition Milling on the Reaction Sintering of Silicon Nitride", Ceramic Bulletin, vol. 58, No. 12, (1979), pp. 1172–1184.
Akunov, "Grinding of Hard Materials in Jet Mills" *Glass & Ceramics*, pp. 668–670.
Crisi, "Selecting Balls and Liners for Grinding Mills," Chemical Engineering, Sep. 7, 1981, pp. 127–129.

*Primary Examiner*—James Derrington
*Attorney, Agent, or Firm*—Felfe & Lynch

[57] ABSTRACT

A novel method of sintering $Si_3N_4$ shaped bodies which method comprises grinding $Si_3N_4$ with the use of a grinding material down to a surface area magnitude of 10.5 to 35 m$^2$/g and an average particle size from 0.2 to 0.005 μm, shaping the powder obtained, and sintering the compact under inert gas or nitrogen at a temperature from 1700° to 1900° C.

9 Claims, 1 Drawing Sheet

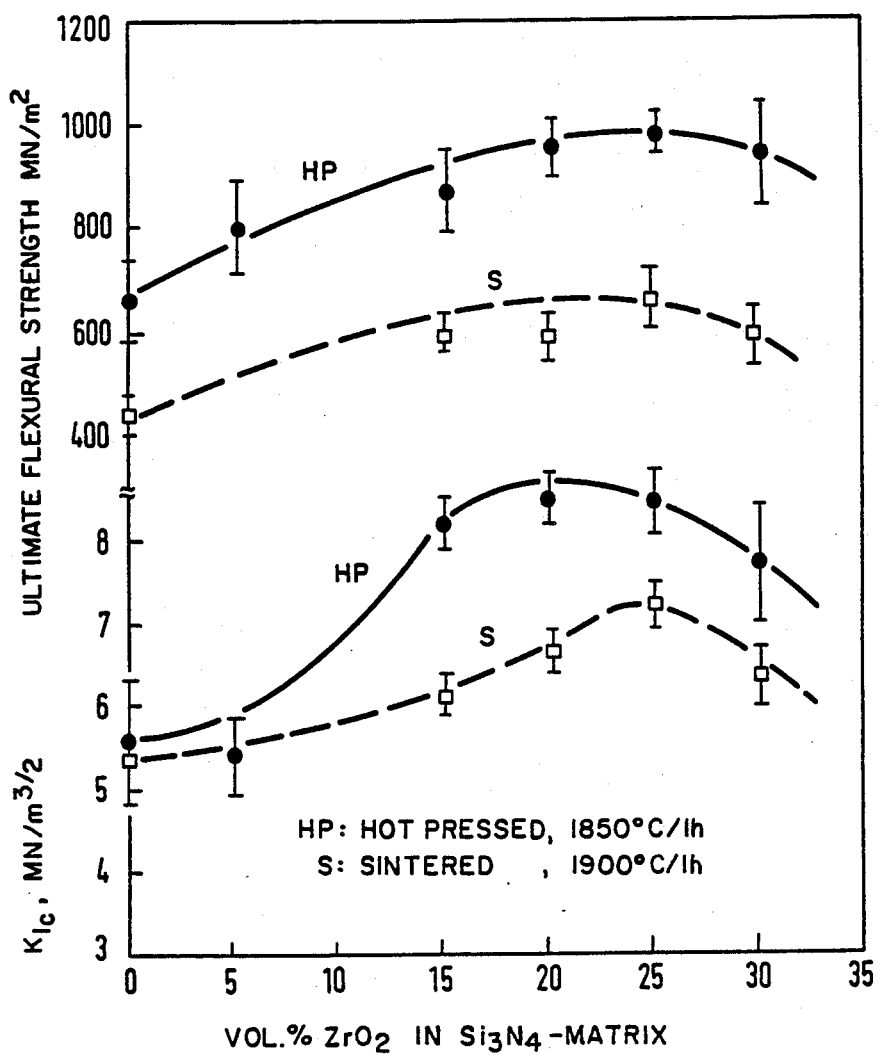

METHOD OF SINTERING ARTICLES OF SILICON NITRIDE

This application is a continuation, of application Ser. No. 857,521, filed Apr. 23, 1986, now abandoned; which is a continuation of Ser. No. 710,941, filed Mar. 13, 1985, abandoned; which is a continuation of Ser. No. 452,279, filed Dec. 22, 1982, abandoned; which is a continuation of Ser. No. 200,845, filed Oct. 27, 1980, abandoned; which is a continuation of Ser. No. 000,613, filed Jan. 2, 1979, abandoned.

BACKGROUND

The invention relates to a method of sintering shaped bodies of silicon nitride ($Si_3N_4$). More particularly, the invention provides such a method which is performed without high pressure or the addition of foreign substances.

For about ten years there has been great interest in silicon nitride, since it is a material of great potential for making articles exposed to high temperatures. Silicon nitride is characterized by a high decomposition temperature and good resistance to thermal shock. Furthermore, it is resistant to oxidation and is generally suitable for use in corrosive environments.

In spite of these outstanding properties, silicon nitride has not been used technically to any great extent, since $Si_3N_4$ it is difficult to fabricate. Hitherto it has been possible to prepare silicon nitride ceramics of satisfactory mechanical properties only by hot pressing. This method, however, is not suitable for economical mass production; furthermore, the material can be shaped to only a limited extent. In addition, it is known to prepare "reaction-sintered" silicon nitride objects, but their mechanical properties leave much to be desired, and they are not comparable to the material sintered under pressure (not pressed).

It is known that in both of the methods mentioned above, the use of sintering aids is necessary. Aluminum oxide, magnesium oxide, zirconium oxide and yttrium oxide have proven most effective for this purpose. These metal oxides are added to the silicon nitride and the compacts prepared therefrom are then sintered. The addition of these sintering aids does permit sintered silicon nitride articles to be made, but at the same time it considerably impairs the very desirable properties otherwise inherent in silicon nitride.

THE INVENTION

The invention provides a method of making sintered silicon nitride articles in which the use of other substances as sintering aids can be entirely omitted, or in which sintering becomes possible without the use of pressure.

Basically, the invention comprises sintering silicon nitride objects by using grinding bodies to grind silicon nitride to a surface area of 10.5 to 35 square meters per gram and an average particle size from 0.2 to 0.05 micrometers, molding compacts from the powder thus obtained, and sintering the compacts under nitrogen or inert gas at a temperature ranging from 1700° to 1900° C.

Surprisingly, the articles made by the method of the invention have extremely good mechanical strengths, which exceed those of hot-pressed sialons ($Si_{6-x}Al_x$ $O_xN_{8-x}$). The invention especially makes it possible to obtain without hot pressing, sintered articles whose mechanical properties equal those of hot-pressed $Si_3N_4$ articles.

The essential features of the method of the invention are on the one hand the grinding of the material with the use of grinding bodies to the above-specified fineness, and on the other hand the sintering within the specified temperature range of the compacts formed from the powder obtained by the grinding. It is not certain what is the cause of the superior sintering properties obtained by the method of the invention, but it is assumed that the grinding process produces in the powder particles a special surface structure to which the improved sinterability is to be attributed. This grinding is performed preferably in an attritor mill. An attritor mill is an apparatus for the mechanical reduction of the size of solid particles by the intense agitation of a suspension of the material to be ground, and a grinding-body medium in the form of coarse granules having a diameter, for example, of 1 to 3 mm (Powder Technology 12 (1975) 19–28).

Regardless of whether the method of the invention is practiced with an attritor or with some other apparatus using grinding bodies, the material of which the grinding bodies are made is important. Preferably, therefore, grinding bodies are used which consist either of silicon nitride or of a material having a specific influence on the sintering characteristics. Preferably this material consists of an oxide or silicate of aluminum, zirconium, magnesium, beryllium and/or yttrium. If grinding bodies of such material are used, especially when they are used in the attritor, the grinding bodies themselves undergo wear, so that a small amount of the material of which the grinding bodies are made is incorporated into the ground silicon nitride. The ground silicon nitride still consists substantially of the pure compound and therefore also has the advantageous mechanical properties of silicon nitride. Grinding with grinding bodies made from the above-named oxides or silicates is therefore preferably carried on only until the silicon nitride has taken up from 1 to 20, preferably 2 to 7 percent, by weight, of the oxide or silicate. At the same time, of course, the grinding conditions must be selected such that at the same time the above-mentioned specifications as regards surface area and average particle size are satisfied.

When an attritor is used, generally about 2 to 6 hours are necessary for this purpose. Preferably, the other components of the mill consist of the above-named material; in the case of an attritor, therefore, the stirrer arms and the vessel walls will be made of it. The main part of the above-mentioned effect, however, is produced by the material of the grinding bodies, while the material of the other components of the grinding apparatus, which are in contact with the silicon nitride, is of secondary importance.

The surface penetration of the above-named oxides or silicates is also possible if they are added during the grinding process itself in some other form, as for example in the form of powder or the like. This embodiment of the method of the invention, however, produces results that are not as good as those achieved by the use of grinding bodies made of the above-named oxides or silicates.

An important advantage of the embodiment of the method of the invention using the above-described grinding bodies or employing the above-specified oxides or silicates in some other form during the grinding is to be seen in the fact that pressure-less sintering of the silicon nitride thus produced becomes possible. As a result, not only is the production of sintered products are rendered more simple and economical, but also the limitations formerly imposed on the complexity of shape of the compacts are eliminated.

In one special embodiment of the invention, the grinding is performed with grinding bodies made of silicon nitride. In this case, either an oxide or silicate can be added to the above-named metals during the grinding process, it being desirable to use an amount of up to 10% of the total weight of the additive and the silicon nitride being ground. Here, too, pressure-less sintering becomes possible, but the strengths which are achieved are not as great as those obtained in the case of grinding bodies made of an oxide or silicate of the above-named metals.

This embodiment of the invention, however, can also be practiced without the addition of an oxide or silicate, in which case the addition of any foreign substance to the finely ground silicon nitride must be avoided. In this embodiment of the method of the invention the sintering can not be performed without pressure, and consequently the application of pressure is necessary, but, even so, the invention makes it possible for the first time to produce sintered articles of pure silicon nitride. These silicon nitride sintered products containing no foreign substances have outstanding properties, especially with regard to their ultimate flexural strength, ultimate toughness and density.

Various qualities of silicon nitride can be used for the method of the invention. Experiments in the use of silicon nitride batches having appreciably different oxygen contents have given always similarly good results under otherwise identical conditions.

The conventional and known methods for the preparation of sintered articles are suitable for the forming of the green compacts. Binding agents can be used. The art of preparing the green compacts for sintering is known to the person skilled in the art and need not be further explained here.

If binding agents are used in producing the compacts, those should be selected which evaporate without residue when heated. It is also possible to shape the compacts roughly and then machine them in order to obtain more complex shapes.

The sintering itself is performed under inert gas, preferably in a nitrogen atmosphere, although other inert gases can also be used. Oxygen or other gases producing an oxidizing effect under the selected temperature conditions are to be excluded, however.

The material of the crucible in which the sintering is performed must be able to withstand the temperatures used, but no other properties are necessary, although the material of the vessel is found in many cases to affect the sintering performance. For example, in the case of boron nitride crucibles evaporation losses are found to be very low, and linear shrinkage is on the order of 10 to 20%. Somewhat greater decomposition losses and lower densities were found when graphite was used. The preferred vessel material is boron nitride, because on the one hand it is found to have the least effect on the surface quality of the sintered product, and on the other hand this crucible material showed the least wear. Enveloping the compacts in silicon nitride powder has proven to be advantageous.

The method of the invention can be applied not only to $Si_3N_4$ but also to silicon nitride containing zirconium oxide. The zirconium oxide content can amount to, say, 30 percent by volume. At contents between about 15 and about 27 percent $ZrO_2$ by volume, maximum characteristics are obtained as regards the strength and toughness of the products. For example, maximum $K_{IC}$ values of about 7.5 $Mn/m^{3/2}$ can be achieved in this case, which have never before been achieved even by the best qualities of hot-pressed silicon nitride.

The advantages achieved in accordance with the invention are not obtained if the above-specified conditions with regard to surface area and particle fineness are not satisfied, excesses being just as disadvantageous as deficiencies. For example, in the case of a greater degree of grinding, obtained by 18 hours of grinding in the attritor using aluminum oxide grinding bodies, the properties of the sintered articles are found to be substantially impaired.

It is an important advantage of the method of the invention that the sintering can be performed without pressure, or, if pressure is used, without the inroduction of other substances. It is, however, also possible to sinter under pressure with the introduction of other substances. In this case, too, improved strength characteristics are achieved.

The sintered articles made by the method of the invention are especially suitable for parts subject to high temperatures and wear in heat engines and energy transfer engines, such as turbine rotors and the like, in ceramic cutting tools and other ceramic objects, attritor balls, and the like. The method of the invention is characterized by simplicity, and in the preferred embodiments it can be performed without pressure, which considerably improves the economy of the process, makes it possible to use simpler apparatus, and reduces the energy required. The articles made by the method of the invention have the advantage over sintered sialon and reaction-bonded silicon nitride (RBS) of substantially better resistance to breakage and toughness. It is approximately 100% superior to the presently obtainable types of sintered sialon and RBSN. Furthermore, high densities can be achieved, even with very low contents of foreign substances, so that the content of the early-softening phase is very low. Correspondingly high densities have been achieved hitherto only with contents of additives, such as aluminum oxide, amounting to decidedly more than 10% and to as much as 60% by weight. Furthermore, the content of free silicon is lower than in the methods known hitherto. Also, the scatter of the characteristics is reduced, and there is no need for a separate pre-alloying of the silicon nitride starting material. A special advantage also lies in the fact that relatively large sintered articles can be produced than have hitherto been possible.

EXAMPLES

The following examples will further explain the invention. Examples 1 to 6 relate to pressure-less sintering, and Examples 7 to 10 to pressure sintering.

Example 1

Low-oxygen silicon nitride was ground for various lengths of time in the attritor with grinding bodies made of aluminum oxide. The specific surface area of the starting material and after grinding for various periods is shown in the table below in grams per square meter.

The average particle size after 4 to 6 hours of grinding was around 0.1 micrometers.

The aluminum oxide content of the silicon nitride after four hours of grinding was 4% and after 6 hours of grinding it was 6.2%, by weight.

The ground powder was compressed isostatically at 600 MN/m$^2$ to form compacts having a diameter of 35 mm which were placed in a covered boron nitride crucible in a resistance-heated graphite body. Then sintering was performed under argon at temperatures between 1850° and 1900° C. for one hour. The density, ultimate flexural strength and the toughness of the sintered articles is also shown in the table below. The edges of the flexural strength testing samples made from the blanks were unbroken.

TABLE I

| Grinding time (h) | 0 | 1 | 2 | 4 | 6 | 18 |
|---|---|---|---|---|---|---|
| Specific surface area of powder in sq. meters per gm | 7.3 | 9.5 | 10.7 | 13.3 | 16.5 | 28.0 |
| Density (g/cm$^3$) | 2.33 | 2.65 | 2.70 | 2.86 | 2.84 | 2.94 |
| $K_{IC}$ (N/mm$^{3/2}$) | 40 ± 4 | 74 ± 4 | 126 ± 6 | 156 ± 9 | 178 ± 6 | 157 ± 10 |
| $\sigma_B$ (N/mm$^2$) | 87 ± 5 | 200 ± 25 | 283 ± 39 | 473 ± 41 | 422 ± 41 | 358 ± 58 |

The experiments performed without grinding and with grinding for one hour are given for purposes of comparison.

Example 2

The procedure of Example 1 was followed, the grinding in the attritor being performed for 6 hours using aluminum oxide grinding bodies. A silicon nitride doped with zirconium dioxide was used. The zirconium dioxide content in percent by volume and the properties of the sintered bodies produced are given below in Table II.

Example 3

100 g of silicon nitride powder (HCST 1910, chemical analysis: Fe 0.02, Ca 0.02, Al 0.21, O 0.04, N 38.4 and C 0.5%) was ground in alcohol in the attritor at 1000 rpm for six hours with 800 grams of aluminum oxide balls (diameter 2 to 3 mm). The specific surface area of the powder was increased by this process from originally 6.2 m$^2$/g to 12.6 m$^2$/g, and approximately 7.5 weight-percent of aluminum oxide detritus was introduced into the powder. The powder was compressed isostatically at 100 MPa to disks (diameter 30 mm, thickness 10 mm) and sintered at about 1850° C. for one hour in a boron nitride crucible. The density of this material amounted to 2.85 g/cm$^3$, the flexural strength 420±24 MPa and the toughness ($K_{IC}$) 5.4±0.4 MN/m$^{3/2}$.

Example 4

The procedure of Example 3 was repeated, except that between 5 and 30% of zirconium oxide by volume was added during the grinding, and the sintering temperature amounted to about 1900° C. An increase of the toughness ($K_{IC}$) and of the flexural strength was achieved, which is represented by curve 5 in FIG. 1 of the appended drawing.

Example 5

100 grams of silicon nitride powder (HCST 2330, same analysis as HCST 1910, specific surface area 6.5 m$^2$/g) ground in the attritor with zirconium dioxide balls (1300 g, 2 to 2.5 mm diameter) yielded, under otherwise the same conditions as in Example 3, a specific surface area of 13.5 m$^2$/g and 26 grams=13% volume of zirconium dioxide detritus. After sintering at about 1880° C. (otherwise same as Example 3), a density of 3.29 g/cm$^3$ and a toughness ($K_{IC}$) of 7.3±0.4 MN/m$^{3/2}$ and a flexural strength of 690±72 MPa were measured.

Example 6

100 g of silicon nitride powder (HCST 2330) was mixed with 5% by volume of aluminum oxide and ground in the attritor under the same conditions as in Example 3 with silicon nitride balls (500 g, diameter 3 mm), resulting in a specific surface area of 11.2 m$^2$/g (+6 grams of silicon nitride detritus from the attritor balls). After sintering at 1880° C. (otherwise same as Example 3), the density amounted to 2.95 m$^2$/g, the toughness ($K_{IC}$) to 4.3±0.2 MN/m$^{3/3}$ and the flexural strength to 348±35 MPa.

Example 7

100 grams of silicon nitride powder (HCST 2330), when ground in the attritor as in Example 3 and hot pressed in graphite molds of 35 mm inside diameter at 1850° C. for one hour, resulted in a density of 3.18 g/cm$^3$, a flexural strength of 840±20 MPa and a toughness ($K_{IC}$) of 6.5±0.4 MN/m$^{3/2}$.

Example 8

100 grams of silicon nitride powder, ground in the attritor with 1200 g of ZrO$_2$+SiO$_2$) balls (SAZ, Rosenthal, diameter 3 mm) as in Example 3, yielded a specific surface area of 13.5 m$^2$ per gram and an attritor ball detritus content of 26.7 g. When hot pressed as in Example 7, the bodies had a density of 3.25 g/cm$^3$, a toughness ($K_{IC}$) of 8.15±0.2 MN/m$^{3/2}$ and a flexural strength of 870±90 MPa.

Example 9

100 g of silicon nitride powder, ground in the attritor as in Example 5 and pressed hot as in Example 7, resulted in a density of 3.50 g/cm$^3$, a toughness ($K_{IC}$) of 8.2±0.2 MN/m$^{3/2}$ and a flexural strength of 970±65 MPa.

Example 10

100 grams of silicon nitride powder, ground in the attritor for 6 hours and 15 hours with 500 g of silicon nitride balls (otherwise same as Example 3) resulted in a specific surface area of 9.3 and 11.2 m$^2$/g, respectively. When hot pressed as in Example 7, the bodies had a density of 3.03 and 3.19 g/cm$^3$, a toughness ($K_{IC}$) of 5.15±0.15 and 6.45±0.15) MN/m$^{3/2}$, and a flexural strength of 702±112 and 760±60) MPa, respectively.

It will be understood that the specification and examples are illustrative but not limitative of the present invention and that other embodiments within the spirit and scope of the invention will suggest themselves to those skilled in the art.

What is claimed is:

1. In a method of pressureless sintering of silicon nitride (Si3N4) wherein a formed powder compact is heated under an inert atmosphere without hot pressing to form a sintered article, the improvement comprising:

grinding silicon nitride in an attritor mill using grinding bodies 1 to 3 mm in size of a material selected from the group consisting of a zirconium oxide material or silicate of aluminum, zirconium, beryllium, yttrium, and a combination thereof, to form a powder having an average particle size of 0.2 to 0.5 micrometers and a surface area of 10.5 to 35 square meters per gram;

forming the powder compact using the ground powder; and heating the powder compact to a temperature in the range of 1700° C. to 1900° C. to sinter the compact into the sintered article.

2. The method of claim 1 wherein the grinding bodies are of zirconium oxide material.

3. The method of claim 1 wherein said grinding is carried out until the Si3N4 has taken up to 10 weight-percent of said oxide grinding body material.

4. The method of claim 1 wherein the powder compact is heated to a temperature which is in a range of from in excess of 1750° C. up to 1900° C.

5. The method of claim 1 wherein the sintering temperature is from about 1850° C. to about 1900° C.

6. In a method of pressureless sintering of silicon nitride (Si3N4) wherein a formed powder compact is heated under an inert atmosphere without hot pressing to form a sintered article, the improvement comprising:

grinding silicon nitride in an attritor mill using grinding bodies of silicon nitride of 1 to 3 mm in size to form a powder having an average particle size of 0.2 to 0.05 micrometers and a surface area of 10.5 to 35 square meters per gram wherein there is added in an amount of up to 10 weight-percent of the total weight of the additive and the Si3N4 employed as a grinding material, at least one of an oxide or silicate of aluminum, magnesium, beryllium and zirconium;

forming the powder compact using the ground powder; and heating the powder compact to a temperature in the range of 1700° C. to 1900° C. to sinter the compact into the sintered article.

7. The method of claim 6 wherein the sintering temperature is from about 1850° C. to about 1900° C.

8. In a method of pressureless sintering of silicon nitride (Si3N4) wherein a formed powder compact is heated under an inert atmosphere without hot pressing to form a sintered article, the improvement comprising:

grinding silicon nitride in an attritor mill using grinding bodies of 1 to 3 mm in size of a material selected from the group consisting of an oxide or a silicate of aluminum, zirconium, beryllium, yttrium, and a combination thereof, to form a powder having an average particle size of 0.2 to 0.05 micrometers and a surface area of 10.5 to 35 square meters per gram;

forming the powder compact using the ground powder; and heating the powder compact to a temperature in the range of 1700° C. to 1900° C. to sinter the compact into the sintered article, the sintered article having a lower limit value $K_{IC}$ of 4.3 MN/m$^{3/2}$.

9. In a method of pressureless sintering of silicon nitride (Si3N4) wherein a formed powder compact is heated under an inert atmosphere without hot pressing to form a sintered article, the improvement comprising:

grinding silicon nitride in an attritor mill using grinding bodies of 1 to 3 mm in size and of a material of oxide or silicate of magnesium to form a powder having an average particle size of 0.2 to 0.05 micrometers and a surface area of 10.5 to 35 square meters per gram;

forming the powder compact using the ground powder; and heating the powder compact to a temperature in the range of 1700° C. to 1900° C. to sinter the compact into the sintered article.

* * * * *

UNITED STATES PATENT AND TRADEMARK OFFICE
CERTIFICATE OF CORRECTION

PATENT NO. : 4,908,171
DATED : March 13, 1990
INVENTOR(S) : Nils Claussen et al It is certified that error appears in the above-identified patent and that said Letters Patent is hereby corrected as shown below:

Column 5, line 37, "O 0.04" should read --O 0.4--.

Signed and Sealed this

Thirtieth Day of March, 1993

*Attest:*

STEPHEN G. KUNIN

*Attesting Officer*   Acting Commissioner of Patents and Trademarks